Nov. 3, 1936. C. R. HANNA Re. 20,155

ELECTRO-DYNAMIC MICROPHONE

Original Filed Aug. 25, 1925

WITNESSES:
C. J. Weller.
W. A. Whitney Jr.

INVENTOR
Clinton R. Hanna.
BY
Wesley G. Carr
ATTORNEY

Reissued Nov. 3, 1936

Re. 20,155

UNITED STATES PATENT OFFICE 20,155

ELECTRO-DYNAMIC MICROPHONE

Clinton R. Hanna, Pittsburgh, Pa., assignor to Westinghouse Electric & Manufacturing Company, a corporation of Pennsylvania Original No. 1,792,300, dated February 10, 1931, Serial No. 52,269, August 25, 1925. Renewed July 17, 1929. Application for reissue July 30, 1932, Serial No. 628,434

33 Claims. (Cl. 179—115.5)

This invention relates to signal translating devices, particularly to microphones or similar devices intended to translate sound into electric current or periodic current to sound.

My invention is principally intended for application to signal translating devices which do not employ a horn and certain aspects of the invention are of more value in connection with microphones that with telephone receivers.

It is an object of my invention to provide a microphone in which the diaphragm shall be shielded effectively from all sounds except those directed toward it from certain angles.

It is a further object of my invention to provide such shielding means so arranged that it shall not cause material restoring forces upon the diaphragm.

This result involves providing a passage from the shielded side of the diaphragm to the open air through which air pressures may be relieved but in which sound waves are attenuated. The means for attenuating the sound waves in said passage tend also to prevent resonance within the shielding device.

The response of the signal translating device at different frequencies should either be uniform or vary according to a simple law, whereby the variations may be compensated by suitably designing the circuit with which the device is connected. If the vibrating system possesses a natural period, within the range of frequencies over which the device is to be used, a corresponding irregularity will be present in the relation between frequency and response.

One way of avoiding such irregularity is to design the vibrating system to have a natural period below the lowest frequency with which the device is to be used; for example, with a microphone or loud speaker the natural period of the vibrating system may advantageously be below audio frequency. One way to accomplish this result is to make the restoring force either zero or very small.

It is a further object of this invention to provide means for so mounting a light, rigid diaphragm that the supporting devices shall serve merely as stops to prevent extreme excursions of the diaphragm and will not ordinarily exert any substantial restoring effect upon the diaphragm.

It is a further object of this invention to provide means for accurately guiding the movement of the diaphragm without incidentally producing the effect either of stiffness or of damping, the accurate guidance of the diaphragm being particularly useful when it is mechanically connected to a coil moving in an air gap and having small clearance.

I provide a flexible member for connecting the small end of the cone to its support, which member can be made out of sheet material by punching or similar operation, shall be small enough to readily be included within the small end of the cone and flexible enough to avoid inducing undesired effects upon the vibrating system. It is also contemplated that the support for the small end of the cone shall be at the center of one pole piece of the magnetic circuit.

Figure 1:
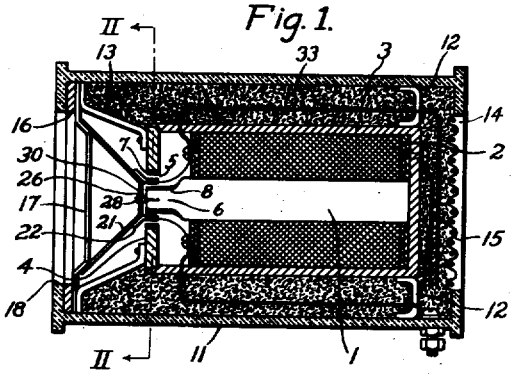
Figure 2:
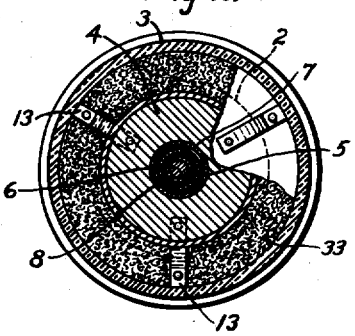
Figure 3:
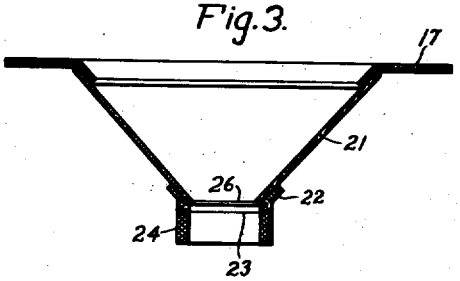
Figure 4:
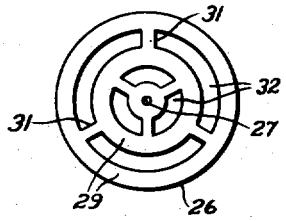

Other objects of my invention and details of the structure will be clear from the following description and the accompanying drawing, in which Fig. 1 is a view, in longitudinal section, of a microphone embodying my invention, Fig. 2 is a section upon the line II—II of Fig. 1, Fig. 3 is a section, upon a larger scale, of the diaphragm and coil, and Fig. 4 is a plan, upon a still larger scale, of the flexible supporting member for the small end of the diaphragm.

The translating device includes a magnet, which may be either a permanent magnet or an electromagnet. The magnet shown comprises a central core 1, a winding 2 and an enclosing cup or shell 3, which is secured to the core 1.

At the other end a cover 4 is provided having good magnetic connection to the shell 3.

The cover 4 has a central opening 5 into which extends the reduced end 6 of the central core 1. The cover 4 and the reduced end 6 thus constitute pole pieces for the magnetic circuit and the space between them constitutes an annular air gap. The surfaces adjacent to the air gap may be plated with conducting material as indicated at 7 and 8.

For example, the surfaces may be copper plated. The purpose of this plating is explained in my copending application, Serial No. 52,268, filed August 25, 1925, now Patent No. 1,691,243 of November 13, 1928, and assigned to the Westinghouse Electric & Manufacturing Company.

The magnet is surrounded by a casing 11 supported from the shell 3 by brackets 12 and 13. One end of the casing has an opening 14, preferably supplied with a screen 15. The brackets 13 at the other end of the casing support a collar 16 to which is secured by cementing, clamping or in any other suitable manner, an annular piece 17 of flexible material, such as kid. The casing 11 has an opening 18 adjacent to the collar 16.

The flexible material 17 is cemented or otherwise secured along its inner margin to a frustoconical diaphragm 21. The inclination of the sides of the cone is such that the diaphragm is very rigid, although it is made of very light material, such as paper.

A collar 22, which is secured to the diaphragm at its smaller end, is preferably of celluloid or similar material which can readily be cemented to the paper. The collar has a shoulder in the same plane with the small end of the diaphragm. The outer portion of the collar is cylindrical and it ends in an edge 23 to which the edge of a coil 24 is cemented. The wire of which this coil is made is held in shape by a binder of cementitious material. It is not necessary, therefore, to provide any form or other supporting frame to keep the coil in its proper shape. Preferably, the binder is a substance, such as cellulose acetate, capable of uniting the coil and the celluloid collar 22. Flexible leads, connected to heavier conductors extending to the exterior of the instrument, afford means of delivering current to or receiving potential from the coil 24.

The coil having been wound upon a mandrel and so positioned that the edge of the coil engages the edge 23 of the collar 22, the coil, collar and cone are treated with the binder which is allowed to solidify with the parts in this position. As a consequence, the coil and cone are united into one rigid body.

The small end of the diaphragm is occupied by a disk or open-work member 26 which may be of celluloid, paper or any other suitable material and may be secured in place by the binder during the same operation. As shown in Fig. 4, the flexible member 26 has a central opening 27, which is intended to receive a screw 28, by which the member 26 is secured upon a standard 30, mounted centrally of the pole piece 6.

The member 26 comprises a number of rings 29, between which connected tongues or links 31 extend. The links 31 divide the spaces between the rings into arcuate openings 32. The links 31 are so arranged that the central part of each opening is opposite a link separating two of openings in the next row. There is thus provided a connection between the screw 28 and the small end of the conical diaphragm which is very flexible at right angles to the plane of the disk 26 and very rigid radially thereof. This connection therefore serves to keep the coil 24 accurately centered in the air gap, enabling the designer to use very small clearances. At the same time, the guide member 26, because it yields readily parallel to the axis of the coil, does not introduce any substantial damping, or sufficient restoring force to affect the results obtained.

In the operation of the device, current through the winding 2 produces a magnetic flux across the air gap. If currents be produced in the coil 24, the coil will be reciprocated because of this flux and will, therefore, agitate the conical diaphragm, producing sound. On the other hand, if sound causes the diaphragm to move, the coil 24 will be reciprocated in the magnetic field of the core 1 and, voltages will be induced in said coil. When operated according to the first method, the apparatus is suitable either for a telephone receiver or a loud speaker. With the second method of operation, it constitutes a microphone.

When the apparatus functions as a microphone, sound entering the opening 18 and impinging upon the conical diaphragm causes the latter and the coil 24 to reciprocate. When the diaphragm moves to the right in Fig. 1, the air within the casing is only slightly compressed by the motion, because the felt 33, with which the casing is filled, is sufficiently porous to permit the air to pass through the casing and emerge through the screen 15 rapidly enough to substantially reduce the pressure. When the motion of the diaphragm is in the opposite direction air entering through the opening 15 will pass through the porous felt and compensate for the movement of the diaphragm. The effect of the casing and felt does not, therefore, produce any considerable restoring effect upon the diaphragm.

At higher frequencies, the diaphragm tends to set up vibrations of the air within the casing, to which the space within the casing is resonant, but the presence of the felt tends to prevent any resonant action. The presence of the felt also tends to prevent sound which impinges upon the screen 15 from affecting the diaphragm.

During the movement of the diaphragm, the annular support 17 is flexed but, as this support is not rigid it exerts no substantial restoring effect upon the diaphragm, but serves merely to prevent the diaphragm from traveling too far. The supporting member 26 acts similarly upon the small end of the diaphragm.

Although I have described in detail, a single specific structure, it will be obvious to those skilled in the art that many modifications may be made without departing from the spirit of my invention. I, therefore, do not intend any limitations except those expressed by the claims or necessitated by the prior art.

I claim as my invention:

1. In a signal translating device, a conical diaphragm, an annular support adjacent the large end thereof, a support adjacent the small end thereof, and flexible connections between each of said supports and the diaphragm, and an electromagnetic system mechanically connected to the smallest section of the cone by a connection to said cone separate from said flexible connections.

2. In a diaphragm support, a standard, a flexible member secured to and surrounding said standard, said flexible member comprising a sheet having arcuate openings therein, and radially-extending portions between said openings.

3. A connecting member for use in a signal translating device, said member comprising a sheet having arcuate openings therein and presenting low resistance to flexure and high resistance to other distortion.

4. In a signal-translating device, a conical diaphragm, a coil support at the small end thereof, and a cementitious bond uniting a coil with said support, said bond, when first applied, comprising an ingredient having a solvent action on said support.

5. In a signal-translating device, a conical diaphragm, a ring cemented thereto at the small end thereof, a coil, and cementitious binding material for rigidly securing said coil to said ring and the turns of said coil together, said binding material, when first applied, comprising an ingredient having a solvent action on said ring.

6. In a signal-translating device, a conical paper diaphragm, a flexible non-resilient annular mounting supporting the large end of said diaphragm, a centrally-supported open-work disk supporting the small end of said diaphragm, a coil, a ring cemented to said disk, said coil and the small end of said diaphragm and a magnetic circuit comprising an air gap within which said coil is located.

7. In a sound-translating instrument, a casing open at each end, an electro-acoustic device within said casing comprising a diaphragm facing one end of said casing, a porous packing on one side of the diaphragm in the space between the microphone and the casing and a screen at the other end of the casing for retaining said packing.

8. In a signal-translating device, a magnet having concentric pole-pieces and an annular air gap between them, brackets carried by one of said pole-pieces, a standard carried by the other pole-piece, a conical diaphragm, and flexible supporting members at the ends of said diaphragm, one member being supported by said brackets and the other member by said standard.

9. A sound reproducer for voice and music comprising a housing having an opening in one face thereof, a stiff vibratile diaphragm mounted in said housing and having one side exposed directly to unconfined air through said opening and having the other side exposed only to air within said housing, said housing having an opening of substantial area in back of said diaphragm and said opening being covered with a layer of sound-absorbing material and means for supporting and driving said diaphragm, comprising an electromagnetic unit.

10. A sound reproducer for voice and music comprising a housing having an opening in one face thereof, a stiff conical diaphragm supported at its center and having one side exposed directly to unconfined air and having the other side exposed only to air within said housing, said housing having an opening of substantial area in back of said diaphragm, and said opening being covered by a sound filter, and means for driving said diaphragm.

11. A sound reproducer for voice and music, comprising a housing having an opening in one face thereof, a stiff, vibratile, conical diaphragm having its concave side exposed directly to unconfined air, and having its convex side exposed only to air within said housing, said housing having an opening of substantial area in back of said diaphragm and said opening being covered with a layer of sound-absorbing material, and means for supporting and driving said diaphragm comprising an electromagnetic unit.

12. A sound reproducer for voice and music, comprising a housing having an opening in one face thereof, a stiff vibratile, conical diaphragm having one side exposed directly to unconfined air through said opening and having the other side exposed only to air within said housing, said housing having an opening of substantial area in back of said diaphragm and said opening being covered with sound-absorbing material, and means for driving said diaphragm.

13. A sound reproducer for voice and music, comprising a housing having an opening on one face thereof, a stiff, vibratile diaphragm mounted in said housing, and having one side directly exposed to unconfined air through said opening, and having the other side exposed only to air within said housing, said housing having an opening of substantial area in back of said diaphragm and a sound filter interposed between said opening of substantial area and said diaphragm, and electromagnetic means for driving said diaphragm.

14. A sound reproducer for voice and music comprising a housing having an opening in one face thereof, a stiff, vibratile diaphragm mounted in said housing and having one side exposed directly to unconfined air through said opening and having the other side exposed only to air within said housing, said housing having an opening of substantial area in back of said diaphragm and said opening being covered with a layer of felt-like material and electromagnetic means for driving said diaphragm.

15. A sound reproducer for voice and music, comprising a housing having an opening in one face thereof, a stiff, vibratile, conical diaphragm mounted in said housing and having one side exposed directly to unconfined air through said opening, and having the other side exposed only to air within said housing, said housing having an opening of substantial area in back of said diaphragm and said opening being covered with a layer of sound-absorbing material, and electromagnetic means for driving said diaphragm.

16. A sound reproducer for voice and music, comprising a housing having an opening in one face thereof, a stiff, vibratile diaphragm mounted in said housing and having one side exposed directly to unconfined air through said opening, and having the other side exposed only to air within said housing, said housing having an opening of substantial area in back of said diaphragm and said opening being covered with a layer of sound-absorbing material so arranged that the sound radiated from the last-mentioned side of said diaphragm does not substantially exceed a small part of the sound radiated from said first side for most of the speech and music frequency range and electromagnetic means for driving said diaphragm.

17. A sound reproducer for voice and music, comprising a housing having an opening in one face thereof, a stiff, vibratile, conical diaphragm mounted in said housing and having its concave side exposed directly to unconfined air through said opening, and having its convex side exposed only to air within said housing, said housing having an opening of substantial area in back of said diaphragm and said opening being covered with a layer of sound-absorbing material so arranged as to absorb a substantial amount of the sound radiated from said convex side and an electromagnetic means for driving said diaphragm.

18. A sound reproducer for voice and music, comprising a housing having an opening in one face thereof, a stiff, vibratile, conical diaphragm, mounted in said housing and having one side exposed directly to unconfined air through said opening and having its convex side exposed only to air within said housing, said housing having an opening communicating with the rear of said diaphragm, said opening being of substantial area and covered with a layer of sound-absorbing material so arranged as to absorb a substantial amount of the sound radiated from said convex side and electromagnetic means for driving said diaphragm.

19. A sound reproducer for voice and music, comprising a housing having an opening in one face thereof, a stiff, vibratile, conical diaphragm supported at its center, and mounted within said housing and having its concave side exposed directly to unconfined air through said opening and having its convex side exposed only to air confined within said housing, said housing having an opening of substantial area communicating with the convex side of said diaphragm and said opening being covered with a layer of sound-absorbing material so arranged as to absorb a substantial amount of the sound radiated from said convex side and electromagnetic means for driving said diaphragm.

20. A sound reproducer for voice and music, comprising a cabinet having an opening in one wall thereof, a stiff vibratile diaphragm positioned within said cabinet at said opening in such manner as to have one side thereof exposed directly to unconfined air, and said cabinet having an opening behind said diaphragm, said opening being covered with a layer of sound absorbing material, and electromagnetic means for driving said diaphragm.

21. A sound reproducer for voice and music, comprising a cabinet having an opening in one wall thereof, a stiff vibratile conical diaphragm positioned within said cabinet at said opening and having one side thereof exposed to unconfined air, said cabinet having an opening behind said diaphragm, said opening being covered with a layer of sound absorbing material, means for preventing circulation of air from one side of said diaphragm to the other within said cabinet, and means for driving said diaphragm.

22. The combination of a support, a diaphragm, and a member connected between said support and said diaphragm and provided with overlapping staggered slots.

23. The combination of a support, a diaphragm, and a member connected between said support and said diaphragm and provided with overlapping staggered slots substantially parallel with the periphery of said diaphragm.

24. In a diaphragm support, a standard, a flexible member secured to and surrounding said standard, said flexible member comprising a sheet having openings bounded by curved edges therein and radially-extending portions between said openings.

25. In a diaphragm support, a standard, a flexible member secured to and surrounding said standard, said flexible member comprising a sheet having arcuate openings therein, and narrow extending portions between said openings.

26. In a diaphragm support, a standard, a flexible member secured to and surrounding said standard, said flexible member comprising a sheet having openings bounded by curved edges therein, and narrow extending portions between said openings.

27. In a sound translating instrument, a casing having a front and rear opening therein, an acoustic diaphragm within the casing and having one of its sides facing said front opening, and a porous packing interposed between the other side of the diaphragm and the other opening in the casing.

28. In a sound translating instrument, a casing having openings in opposite walls, an acoustic diaphragm within the casing and having one of its sides facing the opening in one of said walls and a porous packing interposed between the other side of the diaphragm and the other opening in the casing.

29. In a sound translating instrument, a casing having a front and rear opening, an acoustic diaphragm within the casing and having one of its sides facing one of said openings, and a sound filter within said casing and interposed between the other side of said diaphragm and the other of said openings.

30. An acoustic device comprising, in combination, a convex diaphragm, a cylinder secured to said diaphragm on the convex side thereof, a voice coil on said cylinder, and a flexible suspension secured thereto and to a support, said suspension being in the form of a multiplicity of concentric rings having radial connecting strips, and said strips being offset outwardly.

31. In an electro-acoustic translating device, a magnetic structure, a stiff conical diaphragm flexibly supported therefrom, a porous packing exposed to the atmosphere and surroundng the rear of said diaphragm out of contact therewith and shielding from sounds the side of the diaphragm towards said magnetic structure.

32. In an electro-acoustic translating device, a magnetic structure, a stiff conical diaphragm flexibly supported therefrom, a porous packing exposed to the atmosphere and substantially entirely surrounding said magnetic structure and shielding from sounds the side of the diaphragm towards said magnetic structure, and means for preventing said packing from contacting said diaphragm.

33. In a signal translating device, a conical diaphragm, an annular support adjacent the large end thereof, a support adjacent the small end thereof, and flexible connections between each of said supports and the diaphragm, and a coil entirely located at the small end of the cone.

CLINTON R. HANNA.